May 22, 1956 D. J. NIGG 2,747,126

POWER OR VOLTAGE MEASURING MEANS

Filed May 13, 1954

INVENTOR.
Donald J. Nigg
BY

*Roland R. Anderson*
ATTORNEY

United States Patent Office 2,747,126
Patented May 22, 1956

2,747,126

POWER OR VOLTAGE MEASURING MEANS

Donald J. Nigg, Prairie Village, Kans., assignor to the United States of America as represented by the United States Atomic Energy Commission Application May 13, 1954, Serial No. 429,714

3 Claims. (Cl. 313—216)

The present invention relates to means for measuring power or voltage and more particularly to means for directly, visibly and accurately indicating attainment of peak voltage values.

An object of the present invention is to provide new and improved means for measuring power or voltage.

Another object of the invention is to provide new and improved means particularly useful for direct measurement of peak pulsed power or voltage transients where peak values are to be measured.

Another object of the invention is to provide new and improved means of relatively simple construction and operation for giving a direct indication or measurement of power or voltage.

Another object of the invention is to provide new and improved means of relatively simple construction for giving a direct indication of power or voltage, which is particularly advantageous for field use.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention and various modifications thereof have been chosen for purposes of illustration and description. The preferred embodiment and the modifications are not intended to be exhaustive nor to limit the invention to the precise forms disclosed. They are chosen and described in order to best explain the principles of the invention and their application in practical use to thereby enable others skilled in the art to best utilize the invention in various embodiments and modifications as are best adapted to the particular use contemplated.

In the accompanying drawings.

Figure 1:
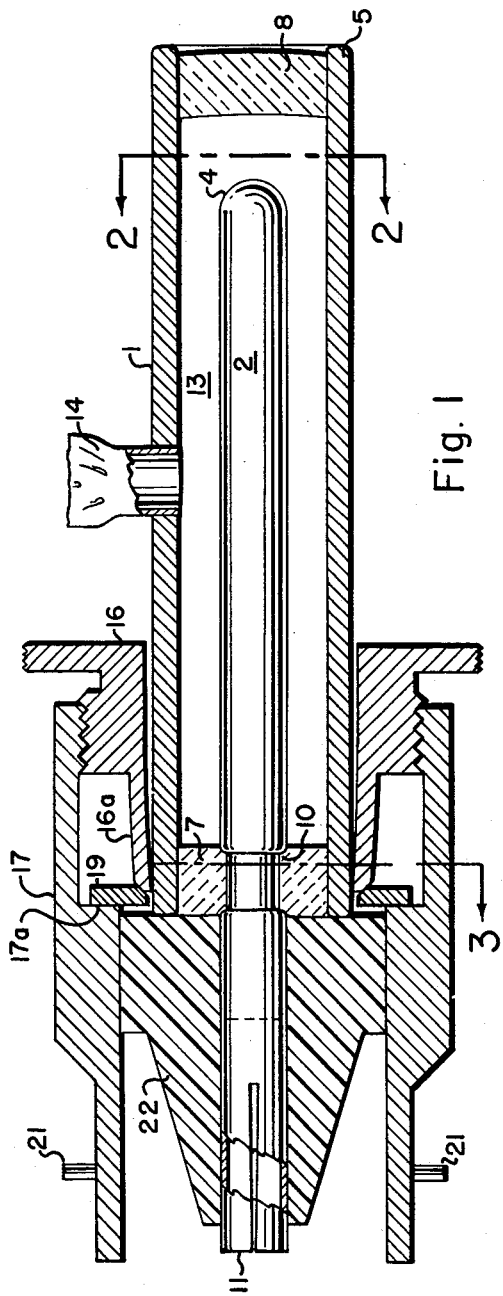
Fig. 1 is a longitudinal sectional view showing a preferred embodiment of the present invention.
Figure 3:
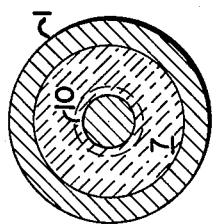
Fig. 3 is a transverse sectional view taken along line 3—3 of Fig. 1.
Figure 2:
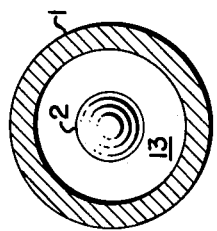
Fig. 2 is a transverse sectional view taken along line 2—2 of Fig. 1.

As shown, the device of the present invention comprises a generally tubular conductor 1 enclosing a portion of a rodlike conductor 2 that is a centrally disposed within the outer conductor 1 and has a generally rounded terminal portion 4 spaced from an adjacent end 5 of the outer conductor. The inner conductor 2 projects through supporting and insulating means 7 which forms an hermetic seal between the inner and outer conductor. The opposite end of the outer conductor 1 is closed and hermetically sealed, at a location spaced from the terminal end 4 of the inner conductor, by substantially transparent or translucent glass or ceramic closure means 8; placing the closure 8 across the outer conductor 1 at a location spaced from the terminal end 4 of the inner conductor, as shown, minimizes any tendency to distort an electrostatic field between inner and outer conductors and is therefore preferable to placing it in a recess formed in a side wall of the outer conductor 1. The spacing is sufficiently great to effectively shield the field inside the device from distortions caused by external fields or nearby objects. The inner and outer conductors may be composed of copper, nickel, or other appropriate materials.

In order to maintain substantially constant characteristic impedance through the dielectric supporting and sealing means 7, or minimize discontinuity caused by increased dielectric constant in the glass, and thus minimize reflections, the inner conductor 2 is provided with an annular undercut or recess 10 into which the dielectric member 7 projects. In addition to the desirable impedance effect, the construction assists in maintaining the inner conductor securely in position against movement with respect to the outer tubular conductor 1. Prongs 11 may be provided at the exposed end of the inner conductor to facilitate connection with an inner member of a coaxial transmission line.

The space 13 intermediate the inner and outer conductors normally contains an ionizable gas, which may be supplied through a seal-off tubulation 14, that also facilitates evacuation of air from the space 13. After air evacuation and supplying of gas to the space 13, the tubulation 14 may be pinched together and permanently sealed to maintain the gas under pressure.

The gas contained in the space 13 is of the type which ionizes and emits visible light under appropriate electrical discharge conditions existing between the rounded terminal end 4 and adjacent inner walls of the tubular conductor 1. Excellent results are obtainable with a generally hemispherical terminal portion 4 and neon gas at pressure of about 8 millimeters of mercury. For further improving results, the breakdown voltage at which ionization and glow discharge occurs may be stabilized, particularly in light-free and shielded locations, by applying a radioactive primer material such as a minute spot 16 of cobalt 60 adjacent the terminal portion 4. A de-ionizing agent such as water vapor or a halogen may be enclosed in the space 13 to assist in de-ionizing in instances where de-ionization time may be important. With this combination ignition occurs at application of about 160 volts D. C. and extinction at voltage reduction to about 145 volts, these ignition and extinction points being consistently repeatable throughout the range of −10° C. to 50° C. If desired, the gas argon at a suitable pressure may be employed in lieu of neon, but the latter is preferred due to its good glow visibility characteristics upon ignition.

A hemispherical or generally rounded terminal portion 4 on the inner conductor 2 is generally preferable to a "square" or abruptly cut-off end as the latter gives a high field concentration at or adjacent its sharp edges and results in an unstable breakdown voltage. The rounded end construction results in a stabilized breakdown voltage in a given tube, as pointed out above, and also less variation from tube to tube due to manufacturing tolerances.

The present device may be attached to the end of a coaxial cable, of known fixed or variable attenuation, by means of prongs 11 on the conductor 2 and a coupling portion comprising a threaded collar 16 having prongs 16a movable into gripping engagement with the outer conductor 1 upon threading of the collar 16 into a socket member 17 and engagement of the prongs with an inclined surface of annular member 19. The socket member 17 may connect in any appropriate manner, for example, by lugs 21, with a complementary coupling portion (not shown) which is in turn connected to a coaxial cable (not shown). As the collar is threaded into socket member 17 to constrict the prongs 16a, the annular member 19 is forced into engagement with a conducting shoulder 17a of the socket member 17 and toward the insulator member 22. Any other suitable coupling means may be employed.

When the device is in operation in combination with a coaxial cable, electrical energy introduced at an input end of the cable can be measured by determining the maximum attenuation permissible in the cable which will cause the tube to conduct; conduction, or breakdown may be readily observed visually through the transparent closure 8.

Since the device terminates the cable in essentially an open circuit prior to gaseous breakdown, the peak voltage at breakdown is ideally twice the peak voltage that would occur for a given incident power if the cable were terminated in its characteristic impedance. Therefore, the incident power ideally is $$\frac{(\tfrac{1}{2}E)^2}{Z_0} = \frac{E^2}{4Z_0}$$

Knowing the attenuation between the generator and the breakdown tube, the generator output power may be readily calculated. For a given application, a correlation between RF breakdown characteristics and the easily measured D. C. breakdown voltage can be made. Such a correlation then provides a simple means of periodic maintenance checks of performance as well as a simple means of obtaining a calibration factor for replacement tubes.

It will be seen that the device of the present invention is of relatively simple, inexpensive and rugged construction and adapted for direct determination or measurement of values of peaked pulsed power or voltage. Ignition or breakdown may be readily observed through the window 8 and the combination with rounded terminal portion of the inner conductor gives consistent breakdown or ignition point as well as a consistent extinction point. The combination provides a precision enclosure for an ionizable gas of such a nature that it constitutes a continuous extension of a transmission system and provides an open circuit termination, modified somewhat by end capacity effects. Such an enclosure results in a predictable and repeatable electric field gradient, the magnitude of which is accurately manifested at one point by sudden ionization (or at another point by de-ionization) of a gas. This ionization is normally observed visually, but could quite obviously be detected electronically such as by the introduction of a third electrode as an ion gauge. The device therefore provides a means of direct quantitative measurement; it differs radially from gaseous discharge devices as qualitative indicators of the presence of an electrical gradient. In addition, employing a radioactive primer material within the tube adjacent the rounded end of the inner conductor assists in stabilizing the device.

As various changes may be made in the form, construction and arrangement of the parts herein without sacrificing any of its advantages, it is to be understood that all matter herein is to be interpreted as illustrative and not in a limiting sense.

I claim:
1. A device of the character described comprising the combination of a generally tubular electrical conductor, an elongate electrical conductor disposed within and extending generally longitudinally of a central axis of said tubular conductor having a generally rounded terminal portion spaced inwardly from and shielded by an adjacent end portion of the tubular conductor and having a portion projecting outwardly beyond an oppositely disposed end of the tubular member for connecting the tubular and elongate conductors with respective outer and inner conductors of a coaxial cable, substantially transparent means closing said adjacent end portion of the tubular conductor and spaced from said terminal portion, dielectric means closing said oppositely disposed end of the tubular conductor and supporting said elongate conductor therein spaced from the tubular conductor, and an ionizable gas within the space intermediate said tubular and elongate conductors and in immediate contact with said conductors throughout their entire lengths intermediate said transparent and dielectric means.

2. A device as claimed in claim 1, in which a vapor is included in said space to facilitate de-ionization of the device.

3. A device of the character described comprising the combination of an outer generally tubular electrical conductor, an inner electrical conductor extending along the longitudinal axis of said tubular conductor and spaced from the inner walls of said outer conductor having a generally rounded end portion terminating inwardly from and shielded by an adjacent end portion of the outer conductor and having a recess extending circumferentially therearound at a location spaced from its rounded end portion and adjacent an oppositely disposed end portion of the outer conductor, means connected with said inner conductor and projecting outwardly beyond said oppositely disposed end portion of the outer conductor for connection with a center conductor of a coaxial cable, substantially transparent means spaced from said inner conductor and its rounded end portion closing said end portion of the outer conductor, annular insulating means filling said recess and projecting therefrom into contact with an adjacent inner wall portion of the outer conductor to support said inner conductor and form an hermetic seal between inner and outer conductors, and an ionizable gas in the space intermediate the inner and outer conductors and in immediate contact with said conductors throughout their entire lengths intermediate said transparent and insulating means.

References Cited in the file of this patent

UNITED STATES PATENTS

| | | |
|---|---|---|
| 2,068,741 | Geffeken et al. | June 26, 1937 |
| 2,411,241 | Arnott et al. | Nov. 19, 1946 |
| 2,412,659 | Thomas | Dec. 17, 1946 |
| 2,427,752 | Strempel et al. | Sept. 23, 1947 |
| 2,612,088 | Cohen | Nov. 4, 1952 |